B. B. BLOOD.
MOTOR.
APPLICATION FILED JULY 23, 1919.
1,378,211.
Patented May 17, 1921.
2 SHEETS—SHEET 2.
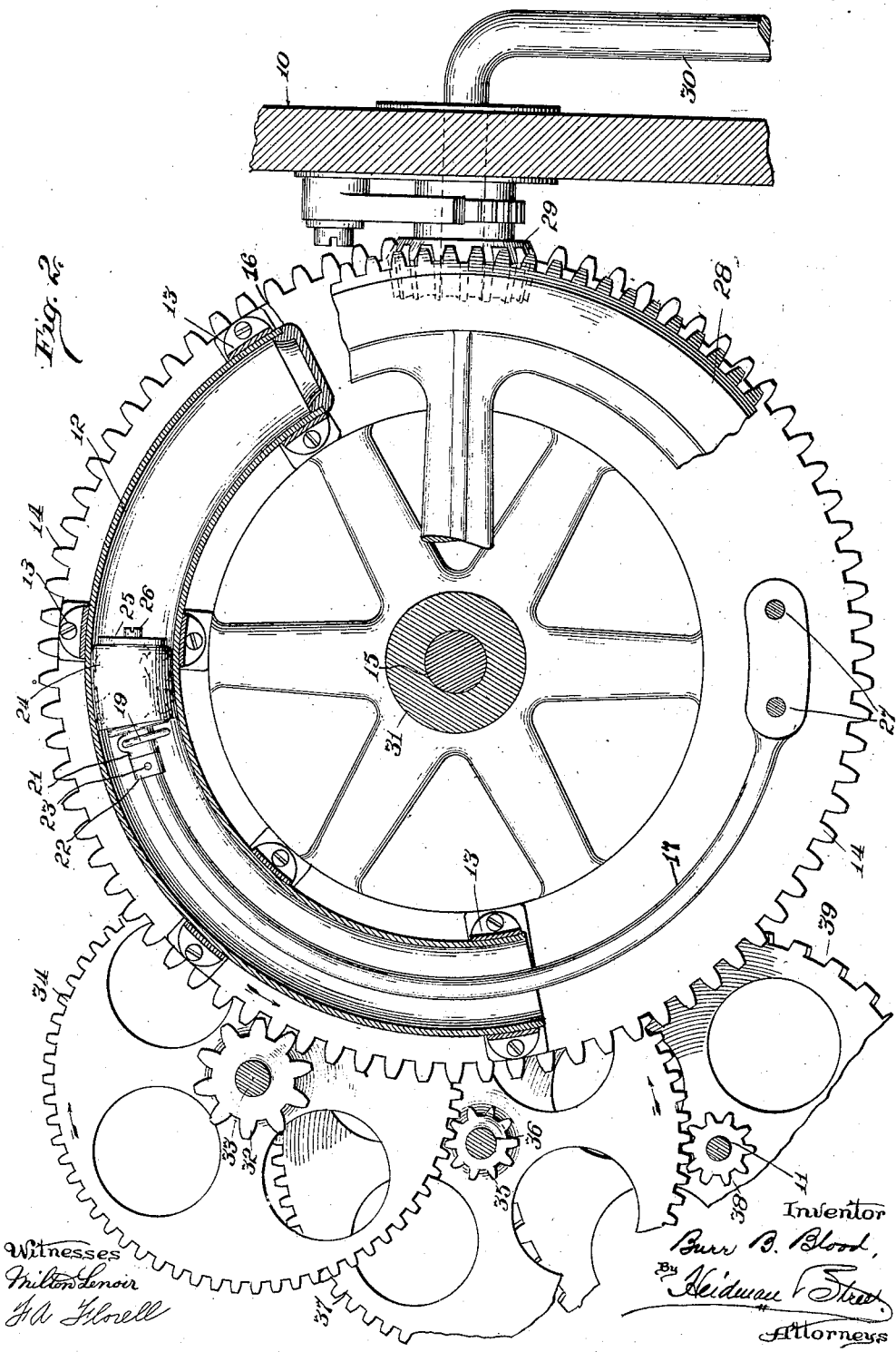

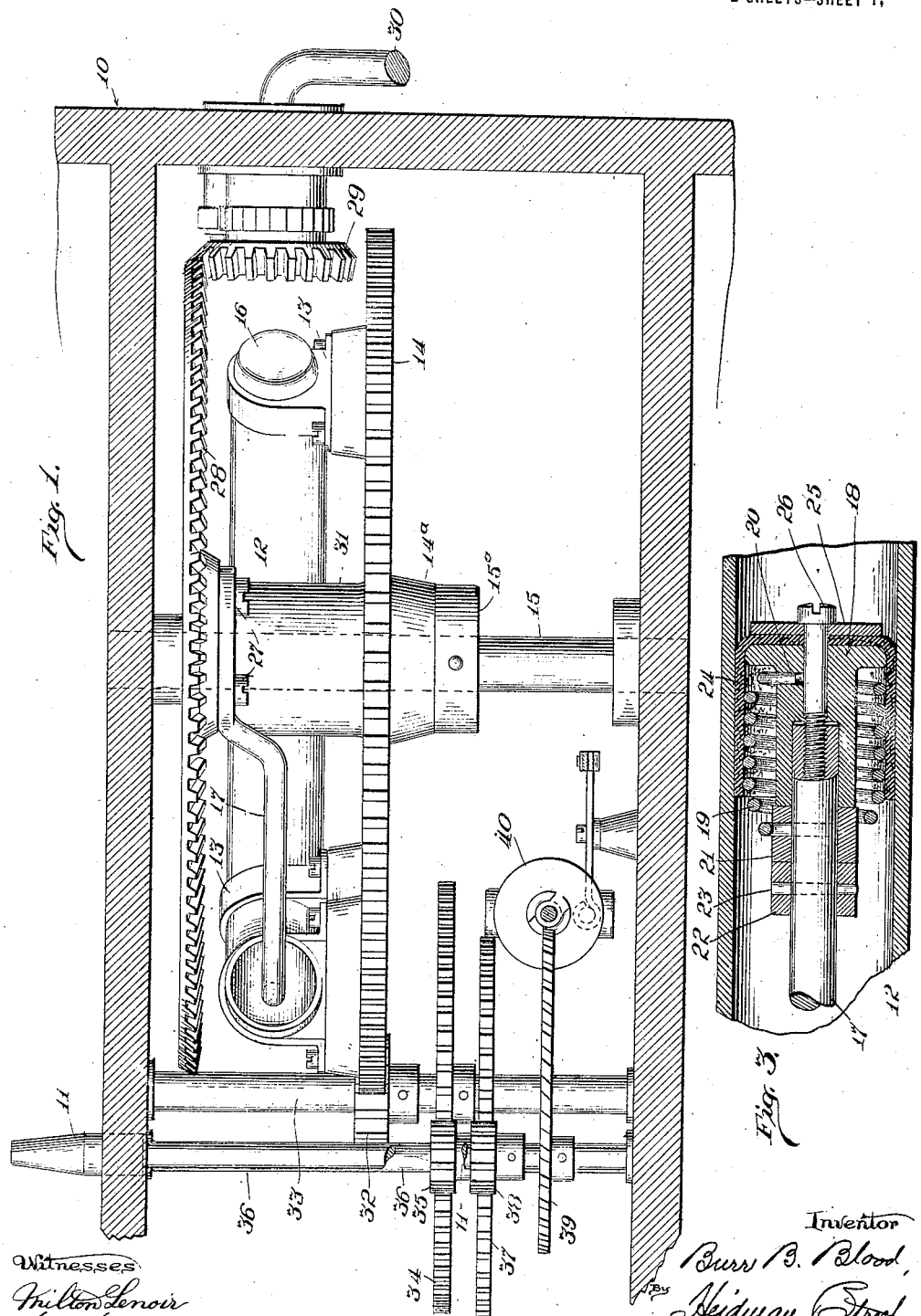

UNITED STATES PATENT OFFICE.

BURR B. BLOOD, OF CHICAGO, ILLINOIS, ASSIGNOR TO GEORGE HEIDMAN AND NORMAN A. STREET, OF CHICAGO, ILLINOIS.

MOTOR.

1,378,211.  Specification of Letters Patent.  Patented May 17, 1921.

Application filed July 23, 1919. Serial No. 312,674.

*To all whom it may concern:*

Be it known that I, BURR B. BLOOD, a citizen of the United States, and a resident of Chicago, in the county of Cook and State of Illinois, have invented certain new and useful Improvements in Motors, of which the following is a description, reference being had to the accompanying drawings, which form a part of my specification.

My invention relates to a vacuum motor more especially adapted for use in connection with a phonograph and the like; the invention having for its object the provision of a construction having means whereby a vacuum may be created on one side of a movable element so that the differences in pressure on opposite sides thereof will cause said element and the members operatively connected therewith to be actuated so as to transmit power to the turn-table of the phonograph.

The objects and advantages of my construction will be more readily comprehended from the following detailed description of the drawings, wherein:—

Figure 1 is a side elevation of my improved motor shown operatively connected with the turn-table spindle of a phonograph; only a portion of the cabinet being shown in section, while the turn-table is omitted.

Fig. 2 is a top plan view and partial sectional view of my improved motor and train of gears for transmitting the power or movement to the turn-table spindle.

Fig. 3 is a detail sectional view of a portion of a vacuum cylinder and piston.

In the particular exemplification of the invention as disclosed in the drawings, the motor is mounted in a suitable cabinet, only a portion whereof is shown at 10; the motor being in a chamber disposed to one side of the turn-table spindle 11. The motor comprises a tube or cylinder 12, preferably made to describe the arc of a circle as shown in Fig. 2, and secured by means of suitable brackets 13, on a rotating member or gear 14 which is rotatably mounted on a supporting post or spindle 15 by means of suitable hubs 14ª; the position of the gear 14 being maintained by means of a collar 15ª which has pin connection with spindle 15.

One end of the tube or cylinder 12 is closed by means of a suitable cap 16, while the opposite end is open for the passage of the piston-rod 17 which is preferably of somewhat greater length than the tube or cylinder 12 and is made to describe a similar arc of a circle.

The piston-rod 17 is preferably provided at its inner end with a suitable head 18 which may be held on the end of the rod by means of the coil spring 19, one end whereof is inserted in a suitable aperture as at 20 in the head, while the opposite end is embedded in the collar or block 21 which is maintained in place by means of a collar 22 held in place on the rod by a suitable pin as at 23, see Figs. 2 and 3. The outer end of the head 18 is preferably flanged circumferentially so as to describe a circle substantially equal to the circle described by the coils of the spring as shown in Fig. 3. The head 18 is intended to be incased within a leather, or other suitable fabric, cup-shaped washer 24 which is adapted to have snug frictional contact with the inner walls of the tube or cylinder 12. The cup-shaped element or washer 24 is held on the head 18 by means of plate or washer 25 which is secured in place by means of the screw 26.

As is apparent from the construction shown in Fig. 3, the fabric or leather washer 24 will be maintained in close relation with the side walls of the cylinder or tube 12 by the expansible action of the spring 19, with the result that an air-tight piston is provided.

The outer end of the piston-rod 17 is secured at 27 to a large bevel gear 28 which is in mesh with the bevel gear 29 secured to the inner end of an operating crank or lever 30 which is suitably mounted in the side wall of the cabinet 10 and disposed to the outside so as to be operable from the cabinet exterior. With this construction, it will be seen that upon proper turning of the crank 30, the large gear 28 will be caused to rotate in a direction which will draw the piston from the inner end of the tube or cylinder 12 toward the outer or open end thereof. With the end of cylinder 12 closed, it is evident that movement of the piston away from the closed end of the cylinder will cause a vacuum to be created within the cylinder intermediate of the piston and the closed end 16 of the cylinder.

The gear 28 is rotatably mounted on the upper end or an extension of spindle 15; being held in spaced relation with the large gear 14 by means of a collar or other suitable element 31; the upper end of the extension or spindle 15 being properly secured in a suitable bearing or in the top portion of the cabinet 10.

The large gear 14 is arranged in mesh with a pinion 32 mounted on a spindle 33 to which gear 34 is also secured; the pinion 32 and gear 34 both being keyed to the spindle 33 so as to cause all of said members to rotate together. The large gear 34 meshes with a pinion 35 secured on spindle 36 to which is secured a gear 37; the pinion 35 and gear 37 being keyed on spindle 36 so as to rotate together. The gear 37 meshes with a pinion 38 which is keyed to the turn-table spindle 11 and causes rotation of the turn-table of the phonograph which is adapted to the usual flat disk type of record.

The turn-table spindle 11 is provided with a worm-gear 39 arranged in operative relation with the worm-shaft of the governor indicated in a general way at 40. As the governor may be of a well known type of construction, it is not specifically illustrated and described; the governor being adapted to control the speed of rotation of the spindle and therefore of the turn-table so as to maintain a preselected speed.

The operation of my improved motor, when the crank 30 is rotated in the proper direction so as to induce the piston to be drawn toward the outer or open end of the cylinder or tube 12, will be readily apparent. With the piston drawn toward the open end of the cylinder or tube 12, a vacuum is created in the tube and the differences in pressure will cause relative movement between the piston and tube or cylinder. As the cylinder 12 is secured to the loosely mounted gear 14, the cylinder will be made to travel lengthwise of the piston, which will induce gear 14 to rotate in the direction of the arrow in Fig. 2, namely in counterclockwise direction, with the closed end of the tube or cylinder 12 traveling toward the piston at the open end of the tube.

Such rotation of gear 14 will induce the gear 34, which is keyed to spindle 33 on which pinion 32 is keyed, to rotate in the direction of the arrow, namely in clockwise direction in Fig. 2. As gear 34 meshes with pinion 35, it will induce gear 37 to rotate in the direction of the arrow or in counterclockwise direction, because gear 37 is secured to spindle 36 to which pinion 35 is keyed. With the gear 37 meshing with the pinion 38, keyed to spindle 11, gear 37 will induce the pinion 38 and therefore spindle 11 and the turn-table secured thereto, to rotate, in Fig. 2, in clockwise direction; while the speed of rotation of the turn-table and the meshing gearing will be controlled by the governor 40 which may be regulated in the usual manner to permit a predetermined speed.

As is apparent from my improved construction, the use of springs for inducing rotation of the spring-barrels and correlated elements is entirely eliminated and the many serious objections and limitations encountered with such constructions, obviated.

With my improved construction, a motor is provided which can operate for a greater period of time, without recranking, than is the case with the spring type of motor at present employed; the length of operation being governed by the length of the cylinder and the speed of operation. Furthermore, a motor is provided which will operate at a constant uniform speed, throughout the relative movement between the cylinder and piston. This is not possible with the usual spring type of motor, wherein the speed tends to diminish as the springs become expanded; while with my motor the relative travel or movement between the cylinder or tube and the piston will maintain and be uniform because the differences in pressure on opposite sides of the closed end of the tube or cylinder will exist to the same degree until the closed end of the tube or cylinder and the piston have been brought into juxtaposition. The relative travel or movement between the cylinder and the piston will be comparatively slow, but by means of the train of gearing employed will provide the necessary speed for the turn-table spindle. It is evident that the period of operation or duration of relative travel between the cylinder and the piston or plunger will be determined by the length of the cylinder or tube; and that with an air-tight relation between the plunger or piston and the inner walls of the cylinder, a constant movement of equal speed, as far as the cylinder or plunger and piston are concerned, will be obtained.

I have shown and described what I believe to be an operative embodiment of my invention, but the invention is susceptible of expression in somewhat different mechanical form without departing from the spirit of the invention.

What I claim is:—

1. A motor of the class described, comprising a cylinder or tube closed at one end, said cylinder or tube being adapted to travel through the arc of a circle; a plunger or piston mounted in said cylinder or tube and in air-tight relation therewith, means whereby the plunger or piston may be drawn toward the open end of said cylinder or tube, and means operatively connected with the cylinder or tube whereby movement of said cylinder will be transmitted to a rotatably mounted member.

2. In a motor of the class described, the combination with a turn-table spindle, of a cylinder or tube having a closed end and mounted so as to move in a circuitous path, means for providing operative relation between said cylinder or tube and said turn-table spindle, a plunger or piston reciprocatingly mounted in said cylinder or tube and having air-tight relation therewith, and means whereby said piston or plunger may be drawn toward the open end of said tube or cylinder and a vacuum in the closed end of the cylinder thereby produced.

3. In a motor of the class described, the combination of a turn-table spindle, with an elongated tube or cylinder having a closed end, a plunger or piston slidably mounted in the tube or cylinder and in air tight relation therewith, means whereby relative movement between the tube or cylinder and the plunger or piston may be induced so as to bring the latter into proximity with the open end of the tube or cylinder and a vacuum in the closed end of the cylinder created, and means whereby the relative movement between the cylinder or tube and piston will be transmitted to the turn-table spindle so as to cause the latter to rotate.

4. A motor of the class described, comprising, in combination with a turn-table spindle, an elongated tube or cylinder having a closed end, a plunger or piston slidably mounted within the tube or cylinder and in air-tight relation therewith, manually operable means whereby relative movement between the cylinder or tube and piston are induced and the latter brought adjacent the open end of the tube or cylinder and a vacuum within the cylinder created, and means whereby the return of the cylinder and piston to normal position will transmit motion, in a rotating manner, to the turn-table spindle.

5. In a motor of the class described, the combination of a turn-table spindle, a manually rotated member, a plunger or piston secured to said member, a rotatably mounted gear disposed parallel with said member, a tube or cylinder mounted on said gear and provided with a closed end, said tube or cylinder being adapted to receive the plunger or piston and have air-tight relation therewith, means intermediate of said gear and the turn-table spindle whereby rotation of the gear, induced by movement of said cylinder, will impart rotary movement to said turn-table spindle.

6. In a motor of the class described, the combination of a turn-table spindle, a manually rotated member adapted to rotate in one direction only, a plunger or piston secured to said member, an arcuate cylinder provided with a closed end, said cylinder being adapted to receive the plunger or piston and have air-tight relation therewith, rotatably mounted means on which the cylinder is secured so as to move therewith, and means intermediate of said rotatable means and the turn-table spindle whereby the latter is rotated through rotation of said rotatable means induced by movement of the closed end of said cylinder toward said plunger or piston.

7. In a motor of the class described, an elongated arcuate cylinder, having a closed end adapted to move through the arc of a circle, an arcuate plunger or piston adapted to move, independently of said cylinder, through the arc of a circle, radially expansible means secured to the inner end of said plunger or piston, a flexible cup element, secured to the inner end of said plunger or piston and about said radially expansible means, adapted to effect air-tight relation with the inner walls of the cylinder, and means whereby the plunger or piston may be drawn toward the open end of said cylinder and thereby held against movement in the opposite direction.

8. In a motor of the class described, an elongated cylinder provided with a closed end, said cylinder being mounted so as to move in one direction, a plunger or piston disposed in said cylinder and held against movement toward the closed end thereof, the inner end of said plunger or piston being provided with radially expansible means, flexible means disposed about said radially expansible means and adapted to provide air-tight relation with the inner walls of the cylinder, and means whereby the plunger or piston may be drawn toward the open end of said cylinder.

9. In a motor of the class described, an arcuate cylinder having a closed end, a rotatable drive member on which the cylinder is secured, a plunger or piston slidably mounted in the cylinder and provided with a removable head comprising an encircling spring and a flexible cup-shape element disposed about the head and said spring and in frictional relation with the inner walls of the cylinder, and means, operable in one direction, whereby the plunger or piston may be drawn toward the open end of the cylinder.

10. A motor of the class described, comprising a tube or cylinder having a closed end and mounted to move through the arc of a circle, a plunger or piston, the inner end whereof is arranged in air-tight relation with the inner walls of the tube or cylinder, means whereby the plunger or piston may be drawn toward the open end of the tube or cylinder and held against movement in the opposite direction, and means whereby movement of the cylinder will transmit power to a driven shaft or element.

11. A motor of the class described, comprising a rotatable gear, an arcuate cylinder having a closed end and secured on said gear so as to move therewith, a second gear disposed parallel with the first gear and in spaced relation therewith, an arcuate plunger or piston having one end secured to said second mentioned gear while the other or inner end is provided with means for providing air-tight relation with the inner walls of the cylinder, means whereby the second mentioned gear may be rotated in one direction and rotation thereof in the opposite direction prevented, said second mentioned gear being adapted to draw the plunger or piston toward the open end of the cylinder, a rotatable driven shaft, and means intermediate of the first mentioned gear and said shaft whereby the shaft is rotated at predetermined speeds through the movement of the first gear induced by the unequal pressures on the closed end of the cylinder.

12. In combination with a driven member, a motor comprising a cylinder or tube closed at one end, said cylinder being movably mounted and arranged in operative relation with the driven member so that movement of the cylinder will be transmitted to said driven member, a piston mounted in said cylinder in air-tight relation therewith, and means whereby the piston may be drawn toward the open end of said cylinder and the piston held against movement in the opposite direction.

BURR B. BLOOD.

Witnesses:
G. HEIDMAN,
F. A. FLORELL.